Oct. 22, 1940.  J. G. M. BRODÉN  2,218,871

VALVE

Filed March 7, 1939

Inventor:
John G. M. Brodén
By Cushman, Darby & Cushman
attys.

Patented Oct. 22, 1940

2,218,871

UNITED STATES PATENT OFFICE 2,218,871

VALVE

John Gustaf Mauritz Brodén, Malmö, Sweden, assignor to Kockums Mekaniska Verkstads Aktiebolag, Malmö, Sweden, a corporation of Sweden Application March 7, 1939, Serial No. 260,449
In Sweden March 24, 1938

7 Claims. (Cl. 251—27)

The present invention relates to valves and in particular to high pressure valves of comparatively small dimensions.

The valve bodies and the valve seats are usually constructed in different manners. For instance, the valve body is provided with an insertion of soft material, while the valve seat consists of a hard material. To obtain perfect sealing between these parts, the valve body must be accurately guided in the axial direction so that it will always be in the same sealing position relative to the seat, in which case the sealing force need not be very great, or, if the valve body is not exactly guided in its axial direction and thus takes different sealing positions relative to the seat, the sealing force must be comparatively great so that it can deform the soft material so that the same will tightly fit the casual shape of the contact surface. In the first-named instance, the exact guiding often causes interlocking of the materials moving relative to each other. This construction renders possible the use of hard materials only which seal against each other.

The present invention has for its object to avoid the inconveniences adherent to said known constructions and to provide a valve construction which excludes the risk of interlocking and reduces the required sealing force and which provides an effective guidance for the valve body relative to the valve seat and yet permits the valve body to move rather inrestrainedly.

I attain this object by mechanism illustrated in the accompanying drawing, in which.

In the figures, similar reference numerals refer to similar parts.

Figure 1:
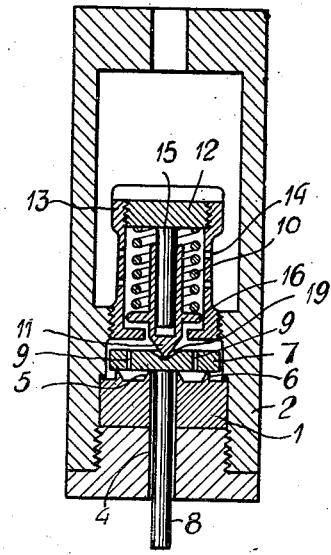
Figure 1 is a longitudinal section of a valve constructed in accordance with the invention.

Referring to Fig. 1, the valve seat 1 is secured to the valve box 2 by means of a screw 3. The seat is provided with a central opening 4 for the gas or other fluid. On that side of the seat where the valve body is disposed, the wall of the opening is in the form of an annular abutting edge 5 of triangular cross-section. A similar edge 6 is disposed outwardly of the edge 5. The valve body 7 is connected to a lifting rod 8 and provided with two openings 9. A pointed sleeve 11 is pressed towards a recess 19 in the valve body under the influence of a helical spring 10. Numeral 12 denotes an adjusting screw, and numeral 13 indicates a cylindrical body provided with openings 14. The pointed sleeve 11 is arranged to slide on a pin 15 connected to the screw 12 and is provided with a collar 16 for the spring 10.

The operation of the valve is as follows: When the rod 8 is moved upwardly, the valve body 7 will be lifted, and the gas or other fluid can flow from the space surrounding the cylindrical body 13 through the openings 14, 9 and 4 to the place of consumption. Due to the openings 9, the pressures acting on the upper and lower surface of the valve body will substantially counterbalance each other whereby the required lifting force is reduced. Since the diameter of the valve seat proper, that is the sealing edge 5, is very small, it is difficult so to guide the valve body by its abutting the seat only that it will not be likely to move into an oblique position relative to the sealing edge and thereby to endanger the same. To prevent such movement, the valve seat is provided with an additional edge 6 for guiding the valve body. In the embodiments shown in Figs. 1 to 5, the point of this edge lies in the same plane as the point of the sealing edge 5. The guide edge 6 prevents the edge 5 from being exposed to damage by the valve body 7.

Figure 2:
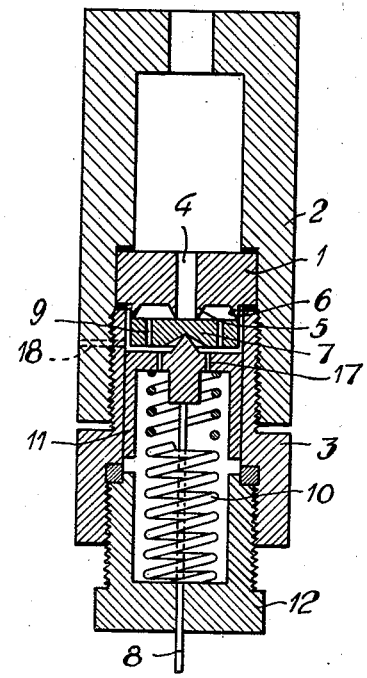
Figure 2 is a similar section showing a modified embodiment.

The embodiment shown in Fig. 2 is constructed substantially in the same manner as that shown in Fig. 1, with the exception that the valve body is held in closed position by the difference of the forces exerted by the spring 10 and the fluid, whereas in the embodiment shown in Fig. 1 the sum of the said forces tends to keep the valve body in contact with the seat.

The valve seat 1 is again secured to the valve box 2 by means of a screw 3 and has an opening 4 and is provided with a sealing edge 5 and a guide edge 6. The valve body 7 has openings 9 and is pressed on the seat by means of a pointed sleeve 11 subjected to the action of the spring 10. The lower end of the spring rests against a screw 12 which tightly closes the interior of the valve. The sleeve 11 has openings 17 for balancing the fluid pressure and is connected to a wire 8 which extends through the head of the screw 12 with a tight fit.

If the wire 8 is pulled downwards, the valve body will be removed from its seat under the influence of the pressure prevailing above the seat, and fluid will flow from the space above the seat through the openings 4 and 9 and further through an opening 18 in the valve box to the place of consumption.

In both embodiments described, the valve body is guided, in the opened position of the valve, solely by the point of the sleeve 11 which engages a corresponding recess 19 in the valve body, said recess having a greater angle than the pointed portion of the sleeve. The clearance between the valve body and the surrounding wall is comparatively large so as to prevent interlocking. The valve body as well as the seat are made of a very hard material. When the valve body is moved from the seat, fluid flows not only through the openings 9, but also past the edge 6. However, the openings 9 are preferably made so large that the greatest portion of the fluid will pass therethrough. The valve body and the seat should be finished very carefully.

Figure 3:
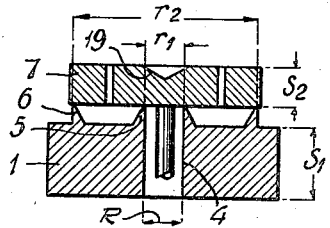
Figure 3 is a detail of Figure 1, shown to a larger scale.

The choice of the dimensions of the valve body and seat is of importance for obtaining a perfect sealing under all conditions. Under the influence of the pressure exerted on the valve seat shown in Fig. 1, the seat will sag, say by twenty thousandths of an inch. In spite of the fact that the pressure exerted on the valve body is considerably lower, the valve body should sag to the same extent as the seat so as to ensure a perfect seal. This condition is fulfilled if $$S_2 \gtreqless S_1 \sqrt[3]{\frac{r_2^2 \cdot \pi R^2}{r_1^4}}$$

where $S_1$ denotes the thickness of the valve seat regardless of the edges 5 and 6, $S_2$ the thickness of the valve body regardless of the recess 19, $r_1$ the radius of the tightening edge, $r_2$ the radius of the guide edge, and R the radius of the opening 4 in the valve (Fig. 3).

In the embodiment shown in Fig. 2, the sag is of minor importance. Here, the valve seat should be made still stronger so as to enable the guide edge to serve its purpose.

Figure 4:
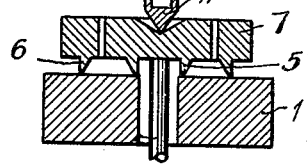
Figures 4 to 8 show a number of modifications of the valve body and seat construction according to Figure 1.

Within the scope of the invention, several of the parts shown can be modified as to their shapes, dimensions and arrangements. For instance, the sealing edge and the guide edge may be provided on the valve body rather than on the valve seat, as shown in Fig. 4.

Figure 5:
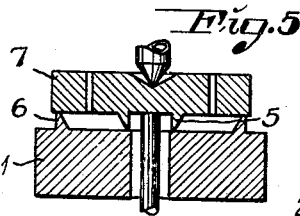
Figure 6:
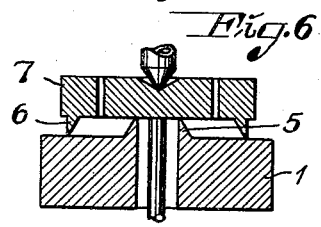

In the modification shown in Fig. 5, the sealing edge 5 is provided on the valve body 7, whereas the guide edge 6 is provided on the valve seat 1. An inverse arrangement is illustrated in Fig. 6 where the sealing edge is arranged on the valve seat, and the guide edge on the valve body.

Figure 7:
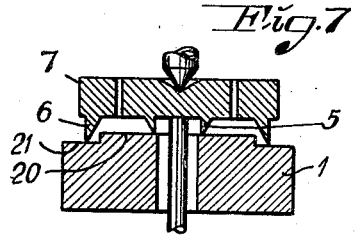

In the modification shown in Fig. 7, the valve body is provided with both the sealing edge and the guide edge. In this instance, however, the edges are disposed in different parallel planes. Accordingly, the upper side of the valve seat 1 provides two parallel surfaces 20 and 21 adapted to be simultaneously in contact with the edges 5 and 6, respectively.

Figure 8:
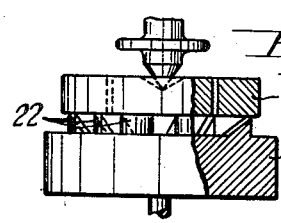

The guide means need not necessarily be in the form of an uninterrupted edge, but may consist of a number of separate members 22 (Fig. 8), the abutting surfaces of which are disposed in a plane at right angles to the longitudinal axis of the part to which they are fixed.

What I claim is:

1. A valve comprising a valve box, a stationary valve member secured to said box, a movable valve member adapted to move towards and away from said stationary member and having a limited possibility of free movement in said box, a sealing edge on one of said members for preventing flow of fluid through said stationary member, a plane surface on the other one of said members for engagement with said sealing edge in the closed position of the valve, a guide edge for said movable member on one of said members, a plane surface on the other one of said members for engagement with said guide edge in the closed position of the valve, said guide edge being disposed radially outwardly of and around said sealing edge, said edges and said surfaces being located in planes at right angles to the direction of movement of said movable member and bounding a substantially annular space, and means independent of the position of said movable member for providing a communication between said space and the opposite side of said movable member.

2. A valve comprising a valve box, a stationary valve member secured to said box, a movable valve member adapted to move towards and away from said stationary member and having a limited possibility of free movement in said box, a circular sealing edge on one of said members for preventing flow of fluid through said stationary member, a plane surface on the other one of said members for engagement with said sealing edge in the closed position of the valve, a circular guide edge for said movable member on one of said members, a plane surface on the other one of said members for engagement with said guide edge in the closed position of the valve, said guide edge being concentric with respect to said sealing edge and having a diameter at least three times as great as the diameter of said sealing edge, said edges and said surfaces being located in planes at right angles to the direction of movement of said movable member and bounding a substantially annular space, and means independent of the position of said movable member for providing a communication between said space and the opposite side of said movable member.

3. A valve comprising a valve box, a stationary valve member secured to said box, a movable valve member adapted to move towards and away from said stationary member, spring-actuated means for forcing said movable member against said stationary member, a universal connection between said spring-actuated means and said movable member permitting of slight movements of said movable member relative to said means, a sealing edge on one of said members for preventing flow of fluid through said stationary member, a plane surface on the other one of said members for engagement with said sealing edge in the closed position of the valve, a guide edge for said movable member on one of said members, a plane surface on the other one of said members for engagement with said guide edge in the closed position of the valve, said guide edge being disposed radially outwardly of and round said sealing edge, said edges and said surfaces being located in planes at right angles to the direction of movement of said movable member and bounding a substantially annular space, and means independent of the position of said movable member for providing a communication between said space and the opposite side of said movable member.

4. A valve comprising a valve box, a stationary valve member secured to said box and having a central opening for the flow therethrough of fluid, a movable valve member adapted to move towards and away from said stationary member and having a limited possibility of free movement in said box, a sealing edge on one of said members for preventing flow of fluid through said stationary member, a plane surface on the other one of said members for engagement with said sealing edge in the closed position of the valve, a guide edge for said movable member on one of said members, a plane surface on the other one of said members for engagement with said guide edge in the closed position of the valve, said guide edge being disposed radially outwardly of and round said sealing edge, said edges and said surfaces being located in planes at right angles to the direction of movement of said movable member and bounding a substantially annular space, and means independent of the position of said movable member for providing a communication between said space and the opposite side of said movable member, the thickness of said movable member being at the most equal to $$S_1 \sqrt[3]{\frac{r_2^2 \pi R^2}{r_1^4}}$$

where $S_1$ is the thickness of said stationary member, $r_1$ the radius of said tightening edge, $r_2$ the radius of said guide edge, and $R$ the radius of said central opening.

5. A valve comprising a valve box, a stationary valve member secured to said box, a movable valve member adapted to move towards and away from said stationary member and having a limited possibility of free movement in said box, a sealing edge and a guide edge on one of said members, a plane surface on the other one of said members for engagement with said edges in the closed position of the valve, said guide edge being disposed radially outwardly of and round said sealing edge, said edges and said surface being located in a plane at right angles to the direction of movement of said movable member and bounding a substantially annular space, and means independent of the position of said movable member for providing a communication between said space and the opposite side of said movable member.

6. A valve comprising a valve box, a stationary valve member secured to said box, a movable valve member adapted to move towards and away from said stationary member and having a limited possibility of free movement in said box, a sealing edge on one of said members for preventing flow of fluid through said stationary member, a guide edge on the other one of said members, plane surfaces on said members for respective engagement with said edges, said guide edge being disposed radially outwardly of and around said sealing edge, said edges and said surfaces being located in planes at right angles to the direction of movement of said movable member and bounding a substantially annular space, and means independent of the position of said movable member for providing a communication between said space and the opposite side of said movable member.

7. A valve comprising a valve box, a stationary valve member secured to said box, a movable valve member adapted to move towards and away from said stationary member and having a limited possibility of free movement in said box, a sealing edge and a guide edge on one of said members, the other one of said members having two parallel plane surfaces for engagement with said respective edges in the closed position of the valve, said guide edge being disposed radially outwardly of and around said sealing edge, said edges and said surfaces being located in planes at right angles to the direction of movement of said movable member and bounding a substantially annular space, and means independent of the position of said movable member for providing a communication between said space and the opposite side of said movable member.

JOHN GUSTAF MAURITZ BRODÉN.